Patented Jan. 21, 1930

1,744,575

UNITED STATES PATENT OFFICE

THOMAS M. RECTOR, OF RUTHERFORD, NEW JERSEY, ASSIGNOR, BY MESNE ASSIGNMENTS, TO THE EMULSOL CORPORATION, OF CHICAGO, ILLINOIS, A CORPORATION OF ILLINOIS

METHOD OF PRESERVING EGGS

No Drawing. Application filed September 28, 1926. Serial No. 138,333.

This invention relates to a method of preserving eggs and particularly to a method adapted to the manufacture of mayonnaise.

A particular object of the invention is to preserve egg yolk for a reasonable period of time in such a condition that it will have all of the freshness of fresh yolk, and in addition that of readily emulsifying with the vegetable oils in the process of making mayonnaise.

The process includes the addition to the yolk of an amount of salt approximately sufficient to saturate the moisture content of the yolk. This added salt inhibits the freezing of the yolk during the subsequent refrigerating process and preserves the yolk in such a physical state that when it is warmed up after the period of refrigeration it remains in a viscous liquid condition ready for emulsifying with the oils. The amount of salt added to the yolk merely reduces the quantity that must be added later when all of the ingredients are being mixed.

Other objects and advantages of the invention will become apparent as the description proceeds.

In the mayonnaise industry it is customary to use only the yolks of the eggs. In a great many plants the eggs are broken and separated on the premises, thereby providing "fresh yolk", in which case the whites are sold for baking purposes. The use of this "fresh yolk" is objectionable; first, on account of the great expense involved; second, on account of the difficulty of breaking eggs without proper supervision; and third, because it is difficult to dispose of the surplus whites on a profitable basis.

In other plants the product known as "frozen yolk" is used. The use of this product, which is formed by freezing the egg yolks, has the disadvantage that when it is thawed out it does not go back to its original liquid condition, but becomes a jelly-like mass with which oil cannot be readily emulsified.

The present invention provides a method of preserving yolk so that it may be economically produced at egg centers, and may therefore be provided as cheaply as "frozen yolk", but which furnishes to the mayonnaise manufacturer a product having all the advantages of "fresh yolk" and besides is in such a physical condition that it emulsifies more readily than fresh yolk.

In practice the yolks are separated from the whites, taking particular care to produce what is known as "dry yolk", meaning yolk containing from four to ten per cent of whites. In ordinary commercial practice the percentage of whites is from ten to twenty per cent.

To this "dry yolk" salt is added in the proportion of from five to twelve per cent, the preferred amount being ten per cent. More than twelve per cent has no value, for the reason that this amount approximately saturates the moisture content of the egg yolk, and further addition of salt would only result in crystalline salt settling to the bottom of the container.

The yolk is now refrigerated and stored at or below 32° F. In this condition the yolk may be held for several days at ordinary temperatures without deterioration. The yolk never freezes, to a thoroughly solid mass, due to the added salt, and when warmed up it remains in a viscous liquid condition ideally suited to emulsifying with vegetable oils.

This method of preserving yolk involving the addition of salt coordinates very well with the process of manufacturing mayonnaise, since salt is a necessary ingredient of mayonnaise, and the amount added to the yolk merely reduces the quantity that must later be added along with the other ingredients.

I am aware that such substances as glycerine, mustard oil, etc. have been used to accomplish essentially the same purpose, but all of these products are foreign to mayonnaise, and in addition have the disadvantage of being comparatively costly.

If it is required that the yolk be held in cold storage for longer periods of time it is desirable to subject it to further steps. The salted yoke may be submitted to the action of vacuum in order to remove the air bubbles, which on long standing would impair the flavor. After the removal of the air bubbles, the yolk may be saturated with carbon dioxide, or other chemically inert gas, and may afterwards be placed in a hermetically sealed container in such a manner that the space above the eggs is filled with carbon dioxide gas. This latter step would insure freedom from rancity due to oxidation, and would also prevent rusting of the can.

I claim:—

1. The method for manufacturing an egg product adapted for use as an emulsifying agent in making mayonnaise, including treating a yolk material consisting essentially of yolk substance with an amount of sodium chloride approximately sufficient to saturate the moisture content of the product and then subjecting the product to a refrigerating process above the freezing point of the resulting mixture.

2. The method for manufacturing an egg product adapted for use as an emulsifying agent in making mayonnaise, including treating a yolk material consisting essentially of yolk substance, with from 5 to 12% of salt, and then subjecting the product to a refrigerating process above the freezing point of the resulting mixture.

3. As a new article of manufacture, a soft refrigerated egg yolk product consisting essentially of egg yolk material and salt sufficient approximately to saturate the moisture content of the product, which has been previously refrigerated a sufficiently low temperature but above the freezing point of the mixture, to produce a product possessing greater viscocity than an untreated, non-refrigerated yolk.

4. As a new article of manufacture, a viscous egg yolk product, consisting essentially of yolk substance and sufficient salt approximately to saturate the moisture content thereof, prepared by subjecting the product to a low temperature below the freezing temperature of unsalted eggs, but above the freezing temperature of the salted product.

In testimony whereof I affix my signature.

THOMAS M. RECTOR.